Nov. 26, 1968    J. HEWETT ETAL    3,412,694

EXTRUSION DIE-HEAD

Filed Oct. 4, 1966    2 Sheets—Sheet 1

INVENTORS
ROBERT N. BATESON
JAMES HEWETT

BY *Harold D. Jastram*

ATTORNEY

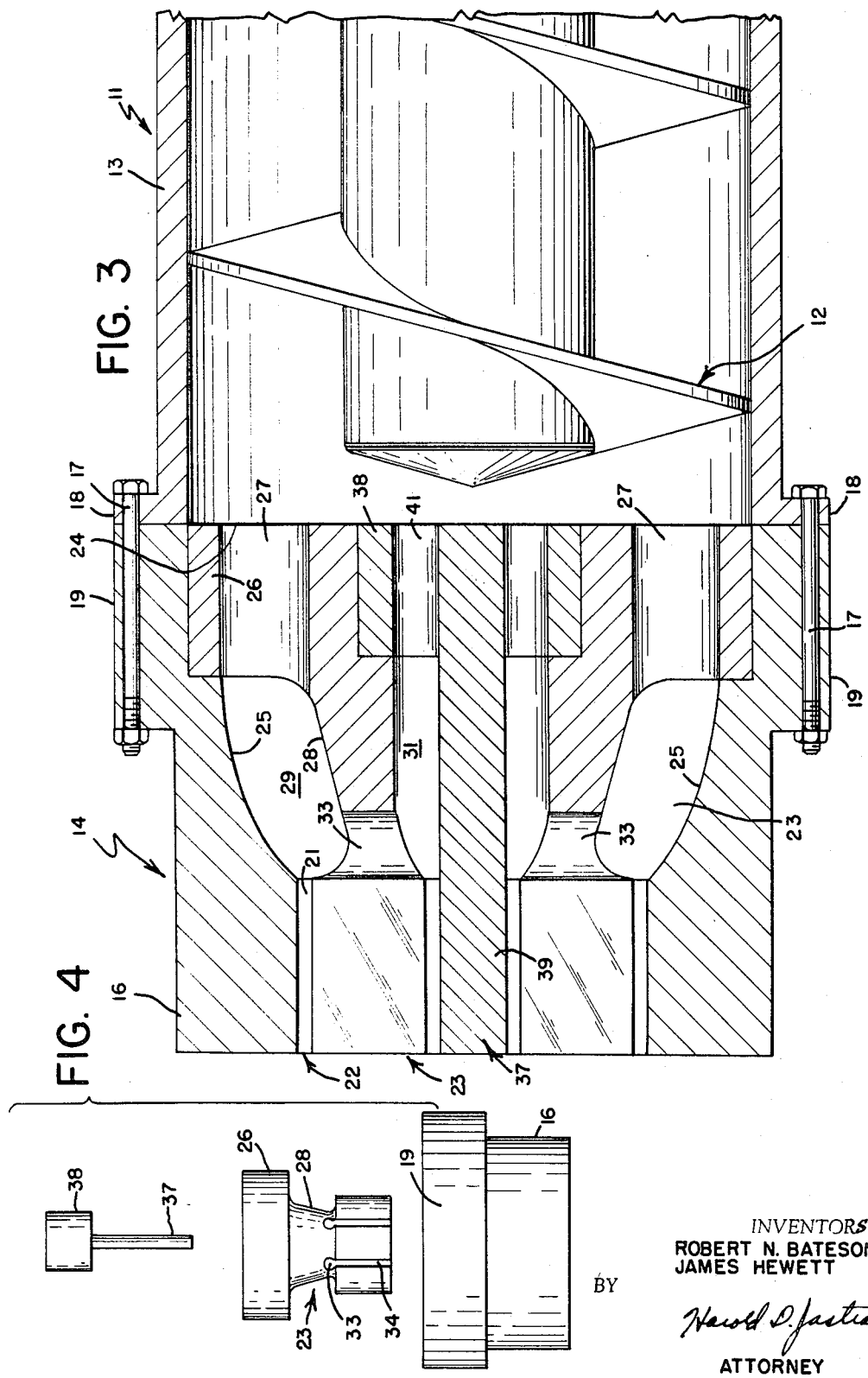

United States Patent Office 3,412,694
Patented Nov. 26, 1968

3,412,694
EXTRUSION DIE-HEAD
James Hewett, Buffalo, and Robert N. Bateson, Minneapolis, Minn., assignors to General Mills, Inc., a corporation of Delaware
Filed Oct. 4, 1966, Ser. No. 584,138
1 Claim. (Cl. 107—14)

ABSTRACT OF THE DISCLOSURE

An extrusion die for producing shaped food products. The die contains shaped chambers which lead to a shaped extrusion opening to insure uniform flow of product from an extrusion barrel through the chambers to the face of the die.

---

Figure 1:
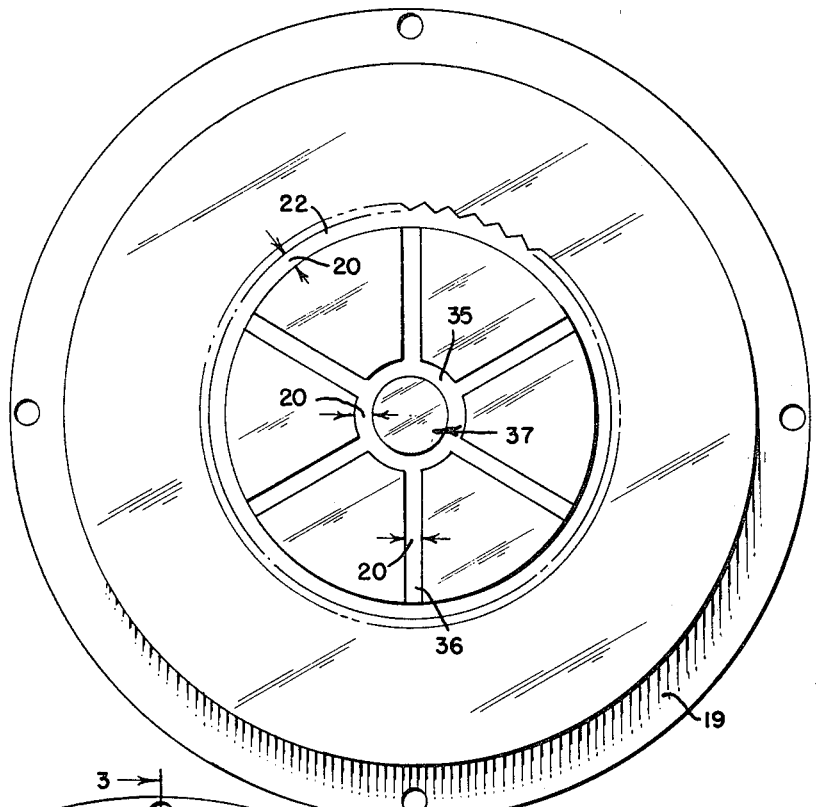

This invention relates to an extrusion die-head for the manufacture of shaped food products and more particularly to an extrusion die-head which equalizes the product flow throughout an irregularly shaped extrusion outlet.

Extrusion die-heads are known in the food industry and are frequently used in the manufacture of certain noodle-type products. These dies are specifically designed for the extrusion of a flour dough product which is made from a specific type of wheat flour. With these specific unvarying product conditions, it is posisble to produce a die which satisfactorily extrudes of uniform shape and quality. These same dies, however, fail to function properly when food product compositions of varying texture, ingredient composition, and the like are used through the same die. This occurs as a result of differences in food product flow characteristics which depend greatly upon the moisture content, the base ingredients, the additives used in the product and the like. These dies frequently fail when an irregular shape is desired for the finished product. The irregular shape results in differing flow rates from differing portions of the extrusion outlet. A screw or similar auger used to force the food product through the die applies a predetermined pressure to the food product. However, as the food product flows through the die having an irregular passage, the pressure throughout the food product may vary so that at certain portions of the outlet, the pressure may be more or less than at other locations. This will result in greater or lesser flow of product from certain portions of the irregular passage or extrusion outlet with the result that a product of low quality and of varying shape characteristics results.

It is therefore an object of the present invention to provide a new and improved die-head for manufacturing a food product of irregular shape.

It is another object of the present invention to provide a new and improved die-head for manufacturing food products of irregular shape in which the composition of the food product may be varied without destroying the uniformity of the irregular shape.

It is yet another object of the present invention to provide a new and improved die-head for the manufacture of irregularly shaped food products wherein the pressure applied to the food product in the die-head is uniform throughout the cross section of the extrusion outlet.

An extrusion die-head incorporating certain features of the invention may include a die-head wherein a core is mounted within a die to form a predetermined irregular extrusion outlet. The die contains an annular groove which cooperates with the core to form an annular chamber where the pressure applied to the food product is equalized so that the product is extruded from the irregular extrusion outlet at a uniform rate under uniform pressure. The extrusion outlet is an irregular shape formed by elongated interconnecting bar like passages which are substantially the same width to insure uniform product flow.

Figure 2:
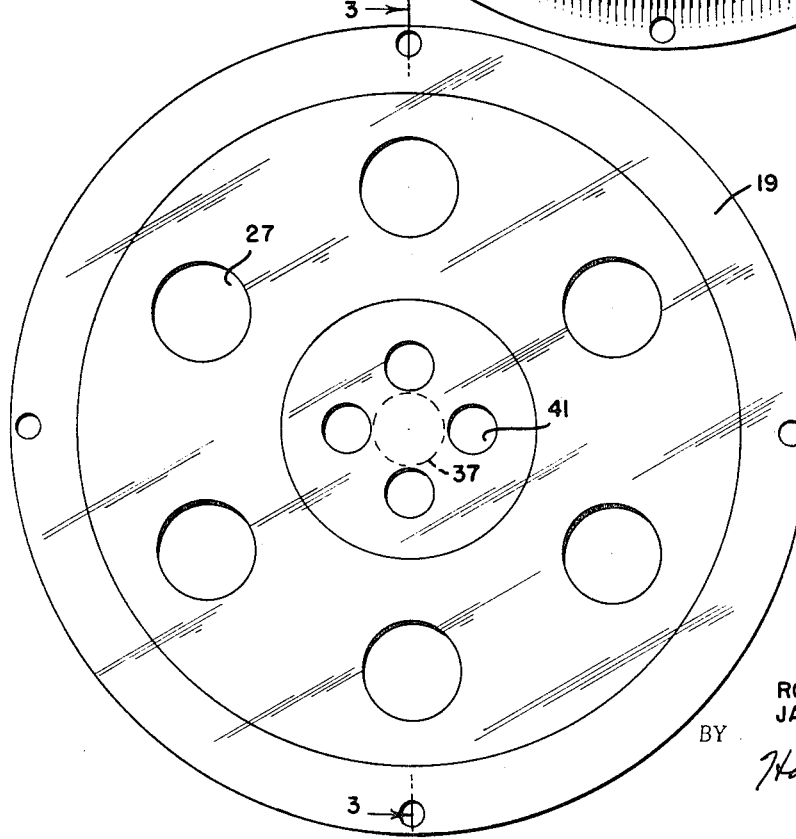

This and other features of the invention may be more fully understood by reference to the specification and the figures in which:

FIGURE 1 is a front view of a die-head illustrating the irregular shaped extrusion outlet, FIGURE 2 is a back view extrusion die-head illustrating the product flow passages from an auger-type extruder, FIGURE 3 is a cross sectional view taken along line 3—3 of FIGURE 2 illustrating the product passages through the die-head from an auger and, FIGURE 4 is an exploded view of the die-head illustrated in the previous figures.

Refer first to FIGURE 3 of the drawings. Food products such as that derived from cereal grains are prepared in an auger generally designated by the numeral 11. The auger 11 contains a screw 12 which fits within housing 13. The screw 12 advances the food product within the housing 13 toward the die-head generally designated by the numeral 14. The die 16 of the die-head 14 is connected to the housing 13 by bolts 17 which connect housing flange 18 and die flange 19.

The die 16 contains a passage which extends from the surface in contact with the housing 13 to the extrusion outlet 22. This passage 21 through the die 16 is irregular in shape and contains an annular groove 25. This annular groove 25 is milled so that material such as food products can flow from the area or chamber 29 into the restricted passage 21 during the extrusion operation. A core 23 is inserted within the passage 21 of die 16 and extends from the auger surface 24 to the extrusion outlet 22 of the die 16. Core 23 is an irregular body and restricts the passage 21 to form an irregular extrusion outlet 22. Flange 26 of core 23 engages die 16 within the die flange 19 so that core 23 is rigidly fixed to the die 16. Core 23 contains a series of passages 27 through which product flows from the auger 11 through passage 21. It is noted in FIGURE 2 of the drawings that there are several passages 27 in the core 23. The number of these passages 27 is not critical, however, they must be sufficiently large or in sufficient number to insure uniform product flow from the auger 11 into the passage 21 of die 16.

Core 23 also contains an annular groove 28 which coincides with annular groove 22 of the die 16. These annular grooves 25 and 28 form an annular chamber 29. Annular chamber 29 acts as a pressure equalizing chamber so that products of varying textural characteristics, ingredient compositions, and of different basic material will pass through the passage 21 at a uniform and controlled rate. Without chamber 29, it has been found that a variety of food products failed to extrude from extrusion outlet 22 at a uniform rate.

Core 23 has a passage 31 which extends throughout the core and is co-axial with the passage 21. The passage 31 includes radial passages 36, see FIGURE 1 of the drawings, which interconnect the passage 21 through die 16 and the main portion of passage 31 in core 23. These radial passages lie along the radial line interconnecting passage 31 and passage 21. In a preferred embodiment, the radial passages 36 lie exactly on the radial line interconnecting the two passages and also are equally spaced as illustrated in FIGURE 1 of the drawings.

As might be anticipated, the flow of material out the irregular extrusion outlet 22 formed by passage 21, radial passages 36 and passage 31 will frequently result in uneven flow of material due to variation in pressure applied to the material as the material passes through the various passages. Pressure is equalized between the passages and throughout the radial passages 36 by connecting passages 33 which interconnect annular chamber 29 and passage 31. In a preferred embodiment there is a connecting passage 33 which coincides exactly with each of the radial passages 36, thereby insuring that material flows through the radial passages 36 at the same rate that it flows through the passage 21 and passage 31. This insures that a product of uniform quality and appearance is produced when the food product is extruded from the irregular extrusion outlet 22.

A uniform rate of extrusion from outlet 22 is also maintained by forming radial passage 36, the outlet end of passage 21 and the outlet end of passage 31 so that the passage width 20 of each passage is substantially equal (see FIGURE 1). By making the passages of equal width 20, the resistance to product flow is the same in each of the passages thus the flow rate from each of the passages will be the same. When a more or less viscous product is used in the die, a satisfactory product will result because of the uniformity of the resistance generated in each of the passages. If a decorative surface is desired then the width 20 of the passage having the decorative serrations may merely be slightly altered to compensate for the increased surface area produced by the serrated surface.

A mandrel 37 is mounted within passage 31 of core 23 and further restricts the passage 31 to form a food product having a circulated center as illustrated by the circle 35 in FIGURE 1 of the drawings. Mandrel 37 is a solid core of material such as brass or the like and is mounted in core 23 to extend throughout the passage 31 from the extruder auger surface of the die-head 14 to the extrusion outlet end 22. The mandrel 37 has a flange 38 which engages the core 23 in the flange area of core 23. The flange 38 provides the support for the extended portion 39 of mandrel 37. Flange 38 of the mandrel 37 also contains a number of product passages 41 through which product flows from the auger 11 into the passage 31 of core 23. Thus it will be observed that there are two directions from which product flows into passage 31. The first is through passages 41 in mandrel 37 and the second route is via connecting passages 33 in the body of core 23 interconnecting the passage 31 and the annular chamber 29. This multiple flow of product through passage insures that sufficient material is supplied to all locations in the irregular extrusion outlet 22 thereby resulting in a product of uniform shape and quality.

Thus it will be observed that the auger 12 forces the food product through passages 27 and 41 into passages 21 and 31 of the die 16 and core 23 respectively. The product moves through the passages at a uniform rate. The product in passage 27 moves into annular chamber 29 where it moves further along passage 21 through die 16 and also a portion of the material through connecting passage 33 into passage 31 of the core 23. Additional material joins this material from annular chamber 23 through passage 31 thus insuring that sufficient product is forced into radial passages 36 to completely fill the passages and produce a product having uniform overall appearance.

It is to be noted that the above described embodiment is merely illustrative of the principles of the invention and other embodiments may be devised by those skilled in the art which may fall within the spirit and scope of the invention.

The embodiments of the invention in which an exclusive property or privilege is claimed are defined as follows:

1. An extrusion die-head for the manufacture of shaped food products which comprises a die having a first extrusion passage extending from a first surface to a second surface of said die, a core mounted in said first passage and extending from said first surface to said second surface, said core forming an annular chamber with said die and an irregular extrusion outlet at said second surface, said core having a second extrusion passage coaxial with said first extrusion passage, a mandrel mounted in said second passage and extending from said first surface to said second surface to further define said extrusion outlet at said second surface, said core having connecting passages interconnecting said annular chamber and said second extrusion passage, the extrusion outlet defined by said first and second passages is two concentric circles interconnected at spaced intervals by bars, said bar shapes being formed by radial passages in said core interconnecting said first and second passages and in which the width of each of said first, second and radial passages are substantially equal to insure a uniform rate of product flow from said outlet, and said core has an annular groove coinciding with said annular chamber for enlarging the volume of said annular chamber.

References Cited
UNITED STATES PATENTS

| | | | |
|---|---|---|---|
| 353,681 | 12/1886 | Hurlbut | 25—17 |
| 1,577,336 | 3/1926 | Marsden | 25—17 XR |
| 2,199,825 | 5/1940 | Kretchmer | 107—14 |
| 2,217,135 | 10/1940 | Parrish et al. | 107—14 |
| 2,974,613 | 3/1961 | Maldari | 107—14 |
| 3,357,051 | 12/1967 | Zolotarevsky | 25—17 |

FOREIGN PATENTS

| | | |
|---|---|---|
| 162,131 | 6/1933 | Switzerland. |

WALTER A. SCHEEL, *Primary Examiner.*

A. O. HENDERSON, *Assistant Examiner.*

PO-1050
(5/69)

UNITED STATES PATENT OFFICE
CERTIFICATE OF CORRECTION

Patent No. 3,412,694      Dated November 26, 1968

Inventor(s) James Hewett and Robert N. Bateson

It is certified that error appears in the above-identified patent and that said Letters Patent are hereby corrected as shown below:

Column 4, line 2, after "material" insert---moves---.

Column 4, line 4, change "23" to read ---29---.

SIGNED AND
SEALED
NOV 18 1969

(SEAL)
Attest:

Edward M. Fletcher, Jr.
Attesting Officer

WILLIAM E. SCHUYLER, JR.
Commissioner of Patents